United States Patent

[11] 3,600,859

| | | |
|---|---|---|
| [72] | Inventor | Darwin D. Edgecomb<br>General Delivery, Avoca, Iowa 51521 |
| [21] | Appl. No. | 829,180 |
| [22] | Filed | June 2, 1969 |
| [45] | Patented | Aug. 24, 1971 |

[54] TOOL-SHARPENING APPARATUS
5 Claims, 4 Drawing Figs.

[52] U.S. Cl. ............................................ 51/48 HE,
51/56
[51] Int. Cl. ............................................ B24b 3/00,
B24b 5/18
[50] Field of Search ............................ 51/34, 34.3,
48 HEL, 56

[56] References Cited
UNITED STATES PATENTS

| 1,448,519 | 3/1923 | Brown | 51/48 HEL |
| 1,566,614 | 12/1925 | Madsen | 51/48 H |
| 2,279,798 | 4/1942 | Shelburne | 51/48 H |
| 2,377,126 | 5/1945 | Brown | 51/48 H |
| 2,493,619 | 1/1950 | Comstock | 51/48 H |
| 2,755,600 | 7/1956 | Smith | 51/48 H |
| 2,879,629 | 3/1959 | Machovec | 51/48 H |
| 2,881,569 | 4/1959 | Strnad | 51/56 |
| 2,907,142 | 10/1959 | Beauloye | 51/56 |
| 3,045,398 | 7/1962 | McEwan | 51/48 H |

Primary Examiner—William R. Armstrong
Attorney—Lee E. Johnson

ABSTRACT: A semiautomatic grinding-sharpening machine for sharpening surfaces with a helical configuration is disclosed. The machine is self-supporting, only electric power need be supplied. It includes an adjustable holder for positioning the workpiece being sharpened, a reciprocating grinding mechanism, and a self-contained coolant supply.

PATENTED AUG24 1971
3,600,859
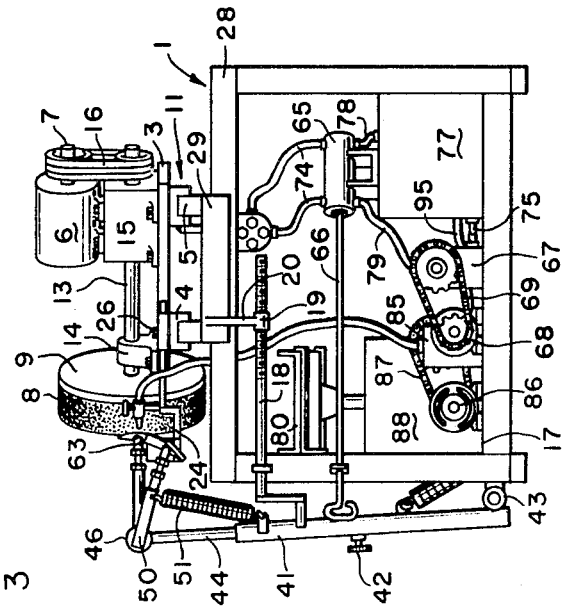
FIG. 3
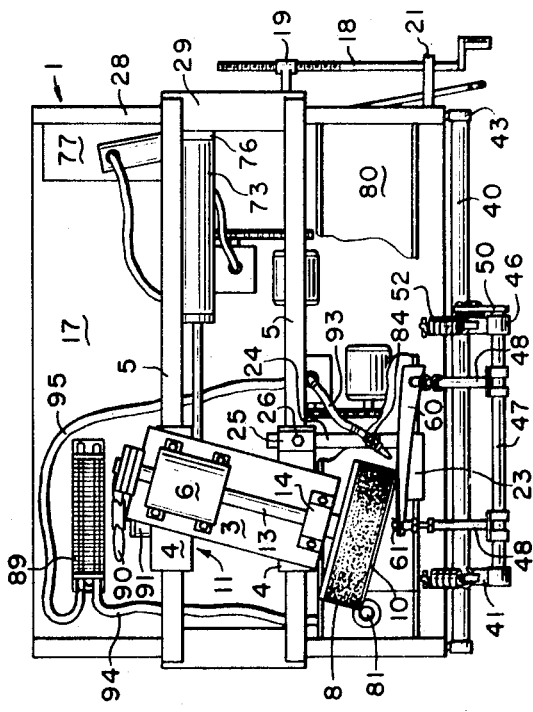
FIG. 1
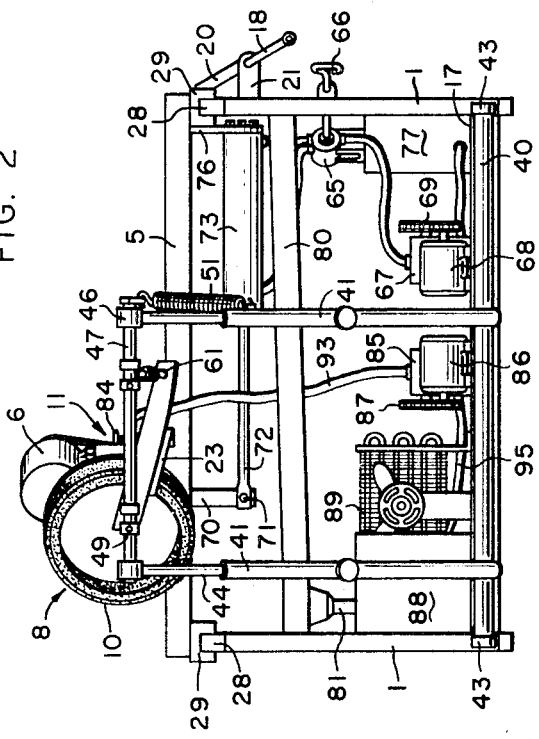
FIG. 2
FIG. 4
INVENTOR.
DARWIN D. EDGECOMB
BY
ATTORNEY

TOOL-SHARPENING APPARATUS

BACKGROUND OF THE INVENTION

In the agricultural areas of the country a great number of forage harvesters and chopping machines are used to chop or pulverize field-cut crops. These machines usually employ a rotary cylinder fitted with blades which cooperate with a stationary cutting edge. The field-cut crop is fed to the rotary mechanism, is cut into short lengths, and conveyed to a storage hopper. The blades utilized by these field choppers have a variety of configurations, depending upon the particular manufacturer of the machine. Some of the blades have a straight line cutting edge while others have a cutting edge which has a helical configuration.

The helical blade has presented many sharpening problems in the machine repair service centers in the agricultural areas where this type of chopper is used. It is very difficult to grind the cutting surface of such a curved blade machine. Therefore, most of the sharpening and regrinding of this type of blade has previously been done by hand methods. Sharpening such a blade by hand is very time consuming and fatiguing upon the operator.

It is therefore desirable to have available a machine which will overcome the problems of sharpening such curved blades. There have been prior attempts to construct machines which will sharpen chopper blades. However, prior machines could not compensate for the curved surface of the chopper blades; and therefore, a very uneven sharpened surface was obtained. It is further desirable to have a sharpening machine which will not only handle helically configured blades but also blades with a straight line cutting edge.

SUMMARY OF THE INVENTION

The invention disclosed herein therefore provides an apparatus for sharpening machine tools comprising: a substructure, a grinding carriage mounted for sliding reciprocal motion on said substructure, means for reciprocating said carriage, a shaft rotatably mounted on said carriage, said shaft mounted at an angle with respect to the direction of reciprocating motion on said carriage, grinding means mounted on said shaft, means for rotatably driving said shaft, blade holding means attached to said substructure for maintaining a machine tool to be sharpened in grinding relationship with said grinding means, tool rest means attached to said carriage for supporting a machine tool to be sharpened as said carriage reciprocates.

BRIEF DESCRIPTION OF THE DRAWINGS

FIG. 1 is a partially schematic illustration of the type of blade for which the machine of the instant invention was designed to resharpen.

FIG. 2 is a front elevation view of the machine of this invention.

FIG. 3 is a side elevation view of the machine of this invention.

FIG. 4 is a top view of the machine of this invention.

DESCRIPTION OF PREFERRED EMBODIMENTS

Referring to FIG. 1, blade 100 is of the type for which the machine of the disclosed invention was designed is schematically illustrated. A single blade 100 is shown mounted on rotating blade carrying hubs 101. Hubs 101 are normally mounted on a shaft 102 which is mounted for rotation in a chopping machine. A cutting bar (not shown) is normally mounted in a position parallel with the shaft 102. Cutting edge 104 of the blade then cooperates with such a cutting bar to chop a field-cut crop. The purpose of this drawing is to better illustrate the helical cutting surface 104 of the blade 100. It will be noted that the cutting surface 104 is equidistant from shaft 102 along its entire length. It will be further noted that the attachment points 103 are offset with respect to each other, giving rise to the helical configuration of the blade 100 and the cutting surface 104.

The remaining description will be directed jointly to FIGS. 2, 3 and 4. Joined to a framed substructure 1 is a floor pan 17. Rigidly attached to the upper portions of substructure 1 are two adjustment runners 28. Slidably positioned on the adjustment runners are adjustment guides 29. Two tracks 5 are longitudinally positioned on the substructure 1 and fixedly attached to adjustment guides 29. The tracks 5 are adjustable forwardly and backwardly through the use of rotatable crank 18. The crank rod 18 is rotatably mounted, but axially fixed, in bracket 21 which is affixed to substructure 1. The threaded portion of crank rod 18 is engaged in nut 19 which is attached in turn to bracket 20. Bracket 20 is fixedly attached to adjustment runner 29. As the crank rod is rotated, the track assembly 5 can be moved forward or backward, depending upon the direction of rotation of rod 18.

Positioned on track 19 is a reciprocating grinding assembly 11. Reciprocating guides 4 are slidably positioned on tracks 5. Fastened to guides 4 is a mounting plate 3. A shaft 13 is rotatably mounted in bearings 14 and 15 which are in turn attached to mounting plate 3. An annularly shaped grinding wheel 8 is affixed to a circular backplate 9 which is in turn concentrically mounted on rotatable shaft 13. Bearing 15 also serves as a motor mount for drive motor 6. Motor shaft 7 transmits power to belt and pulley assembly 16 which drives rotating shaft 13. Generally it is preferred that the grinding wheel 8 rotate from 1800 to 3600 r.p.m.

Attached to the front bottom portion of substructure 1 are a pair of bushings 43. Rotatably mounted in these bushings is a horizontal blade holder frame 40. Two vertical blade holder frames 41 are rigidly attached to horizontal frame portion 40. The bottom portion of the vertical blade holder frame is tubular. An upper rod portion 44 is inserted in each of the tubular vertical frame portions. These rod portions are vertically adjustable within two portions 41 by means of adjustment set screws 42. Bushings 46 are attached to the top of vertical portions 44. Blade holder crossbar 47 is rotatably inserted in bushings 46. Blade holders 48 are rigidly but adjustably attached to crossbar 47. The blade holders can be adjusted by means of set screws 49 which when loosened allow the blade holders 48 to rotate on crossbar 47. A blade 60 or other tool to be sharpened or reground is removably attached to blade holder 48 by attachment nuts 61.

A blade guide rest 23 is positioned in front of grinding wheel 8. The blade guide is fixed to a blade guide holder 24 which is positioned in holder attachment plate 25 and is removably fixed thereto by attachment bolt 26. The blade guide is positioned at an angle with respect to the horizontal direction of reciprocation, which angle is equal to the helix angle of the helically shaped blade or surface to be sharpened. Positioning the blade guide thus will allow proper positioning of the blade with respect to the grinding surface 10 of grinding wheel 8 at all points along the surface to be sharpened.

The mechanism of the blade holder frame then allows the blade to move both toward and away from the grinding wheel 8 and also allows it to rotate with respect to blade holder crossbar 47, thus keeping the surface of blade to be sharpened in tangential contact with the grinding surface 10 at all times. The blade is biased onto blade guide 23 and toward grinding surface 10 by means of biasing bar 50 and spring 51 and horizontal bias spring 52.

If a straight blade is to be sharpened, adjustment screws 49 are loosened and blade holders 48 are moved into a parallel position. A horizontal blade rest is substituted for the angled blade rest 23. The straight blade is then positioned on the rest and sharpened. Of course the upper rod portions 44 of the blade holder frame may have to be adjusted to improve the contact angle of the blade with grinding surface 10.

The grinding assembly 11 is caused to reciprocate on tracks 5 by a hydraulic system. A hydraulic cylinder 73 is attached by bracket 76 to adjustment guide 29. Piston rod 72 is pivotally attached at 71 to a bracket 70. The bracket 70 is fixedly attached to guide 4 of the reciprocating grinding assembly 11. A hydraulic pump 67 is attached to floor pan 17. The pump is driven by motor 68 through chain and sprocket arrangement 69. A hydraulic reversing valve 65 is positioned on top of hydraulic fluid sump 77. The reversing valve 65 is in fluid communication with cylinder 73 through hydraulic hoses 74. The hydraulic fluid sump 77 is in fluid communication with pump 67 through hydraulic hose 75. Hydraulic fluid is supplied from pump 67 to the reversing valve through hydraulic hose 79.

The flow of hydraulic fluid through hoses 74 to cylinder 73 is reversed by actuating valve switch 66. When switch 66 is in its first position, fluid flows in one direction through hoses 74 causing piston rod 72 to slide the grinding assembly 11 in one direction. When valve switch 66 is placed in its second position, the flow of hydraulic fluid through hoses 74 is reversed, thus causing piston rod 72 to reciprocate the grinding assembly 11. The reversing valve 65 is shown in the illustrations as being manually actuatable. The reciprocation of grinding assembly 11 can easily be converted to an automatic system by positioning adjustable trip switches connected to the reversing valve. These trip switches would be positioned along tracks 5 at a desired position to reciprocate the grinding wheel through a distance dependent upon the length of blade being sharpened.

A self-contained cooling system is also included as part of the subject invention. A coolant storage tank 88 is positioned on floor pan 17. A coolant pump 85 is attached to floor pan 17 and is driven by motor 86 through chain and sprocket arrangement 87. A cooling coil 89 is in fluid communication with storage tank 88 through line 94, and with the coolant pump through line 95. The pump 85 forces a coolant, preferably water through line 93 up to nozzle 84, which is positioned to spray coolant onto the blade 60 at the point of contact with grinding surface 10. As the coolant is used it will fall downwardly by gravity into sloped drain pan 80. The water or other coolant runs into drain 81 which carries the coolant to storage tank 88. A fan 90, driven by motor 91 is provided to bring heat exchange fluid in contact with coil 89 to remove heat from the coolant to be sprayed on blade 60.

It is to be understood that all of the motors illustrated in conjunction with the above description are driven by a power source which is not shown. These motors, of course, are preferably electric. Various modifications of the above invention can be made without departing from the scope and spirit of the invention. For example, a chain drive coupled to a hydraulic motor could be substituted for the hydraulic piston which is illustrated.

Therefore what I claim is:

1. An apparatus for sharpening machine tools comprising:
   a. a substructure,
   b. a grinding carriage mounted for sliding reciprocal motion on said substructure,
      i. means for reciprocating said carriage,
   c. a shaft rotatably mounted on said carriage, said shaft mounted at an angle with respect to the direction of reciprocating motion on said carriage,
      i. grinding means mounted on said shaft,
      ii. means for rotatably driving said shaft,
   d. blade holding means attached to said substructure for maintaining a machine tool to be sharpened in grinding relationship with said grinding means, said blade holding means comprising a frame member pivotally mounted at one end to said structure, a pair of tool supports pivotally attached to the other end of said frame member, said tool supports capable of receiving a tool to be sharpened, means for securing a tool to said tool supports,
   e. tool rest means attached to said carriage for support a machine tool to be sharpened as said carriage reciprocates, said tool rest means mounted at an angle with respect to the direction of reciprocation of said carriage, said angle corresponding to the helix angle of a tool to be sharpened which has a helically shaped knife edge.

2. An apparatus for sharpening machine tools comprising:
   a. a substructure,
   b. a grinding carriage mounted for sliding reciprocal motion on said substructure,
      i. means for reciprocating said carriage,
   c. a shaft rotatably mounted on said carriage, said shaft mounted at an angle with respect to the direction of reciprocating motion on said carriage,
      i. grinding means mounted on said shaft,
      ii. means for rotatably driving said shaft,
   d. blade holding means attached to said substructure for maintaining a machine tool to be sharpened in grinding relationship with said grinding means,
   e. tool rest means attached to said carriage for supporting a machine tool to be sharpened as said carriage reciprocates,
   f. a hydraulic cylinder attached to said substructure,
   g. a hydraulic piston and rod operably associated with said cylinder, said rod attached to said carriage,
   h. a hydraulic reversing valve supported by said substructure, said valve in operable fluid communication with said cylinder,
   i. a hydraulic pump supported by said substructure in operable fluid communication with said valve, and
   j. a hydraulic fluid sump supported by said substructure in operable fluid communication with said valve and said pump.

3. An apparatus for sharpening machine tools comprising:
   a. a substructure,
   b. a grinding carriage mounted for sliding reciprocal motion on said substructure,
      i. means for reciprocating said carriage,
   c. a shaft rotatably mounted on said carriage, said shaft mounted at an angle with respect to the direction of reciprocating motion on said carriage,
      i. grinding means mounted on said shaft,
      ii. means for rotatably driving said shaft,
   d. blade holding means attached to said substructure for maintaining a machine tool to be sharpened in grinding relationship with said grinding means,
   e. tool rest means attached to said carriage for supporting a machine tool to be sharpened as said carriage reciprocates,
   f. a reservoir for cooling fluid,
   g. a pump in fluid communication with said reservoir,
   h. a heat exchanger in fluid communication with said pump,
   i. means for causing a heat exchange fluid to move in heat exchange relationship with said heat exchanger,
   j. conduit means in fluid communication with said heat exchanger for supplying cooling fluid to the grinding means, and,
   k. collector means for returning cooling fluid to said reservoir after use.

4. The apparatus of Claim 1 wherein the length of said frame member is adjustable relative to the distance between its point of attachment to said substructure and the point where said tool supports are attached.

5. The apparatus of Claim 1 wherein said tool supports have the same pivotal axis and are adjustable relative to each other about said axis.